US010719270B2

(12) United States Patent
Park et al.

(10) Patent No.: US 10,719,270 B2
(45) Date of Patent: Jul. 21, 2020

(54) RAISING USAGE RATES OF MEMORY BLOCKS WITH A FREE MSB PAGE LIST

(71) Applicant: SK hynix Inc., Gyeonggi-do (KR)

(72) Inventors: Sung Jin Park, Gyeonggi-do (KR); Jong Min Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 112 days.

(21) Appl. No.: 16/116,464

(22) Filed: Aug. 29, 2018

(65) Prior Publication Data

US 2019/0258425 A1 Aug. 22, 2019

(30) Foreign Application Priority Data

Feb. 19, 2018 (KR) ........................ 10-2018-0019160

(51) Int. Cl.
*G06F 12/00* (2006.01)
*G06F 3/06* (2006.01)
*G06F 12/02* (2006.01)

(52) U.S. Cl.
CPC .......... *G06F 3/0659* (2013.01); *G06F 3/0604* (2013.01); *G06F 3/064* (2013.01); *G06F 3/0644* (2013.01); *G06F 3/0679* (2013.01); *G06F 12/0253* (2013.01); *G06F 2212/1044* (2013.01); *G06F 2212/7205* (2013.01)

(58) Field of Classification Search
CPC .. G06F 3/0659; G06F 3/0644; G06F 12/0253; G06F 3/0679; G06F 3/064; G06F 3/0604; G06F 2212/1044; G06F 2212/7205; G06F 2212/7202; G06F 3/0608; G06F 3/061; G06F 12/0246; G06F 2212/7201
See application file for complete search history.

(56) References Cited

U.S. PATENT DOCUMENTS

| | | | | |
|---|---|---|---|---|
| 8,902,652 | B1* | 12/2014 | Huang | G11C 11/5628 365/185.03 |
| 2008/0183949 | A1* | 7/2008 | Ly | G06F 12/0246 711/103 |
| 2009/0307413 | A1* | 12/2009 | Chu | G06F 12/0246 711/103 |
| 2011/0138105 | A1* | 6/2011 | Franceschini | G06F 12/0246 711/103 |
| 2012/0079167 | A1* | 3/2012 | Yao | G06F 3/0679 711/103 |
| 2012/0131264 | A1* | 5/2012 | Oikawa | G06F 12/0246 711/103 |

(Continued)

FOREIGN PATENT DOCUMENTS

KR 1020090011773 2/2009

*Primary Examiner* — Adam M Queler
*Assistant Examiner* — Arnold Hsieh
(74) *Attorney, Agent, or Firm* — IP & T Group LLP

(57) ABSTRACT

A data storage device include a nonvolatile memory device having a plurality of super blocks; a memory configured to store a free first logical page list including position information of free first logical pages which are present in completely used super blocks, among the plurality of super blocks; and a processor configured to select a super block having no valid page and having the free first logical pages, among the completely used super blocks, based on the free first logical page list, and to use the free first logical pages in the selected super block during a write operation.

11 Claims, 11 Drawing Sheets

(56) References Cited

U.S. PATENT DOCUMENTS

| | | | |
|---|---|---|---|
| 2013/0080730 A1* | 3/2013 | Kim | G06F 3/0679 |
| | | | 711/203 |
| 2013/0250677 A1* | 9/2013 | Nam | G11C 13/0002 |
| | | | 365/185.03 |
| 2014/0043900 A1* | 2/2014 | Shimono | G11C 16/06 |
| | | | 365/185.03 |
| 2014/0108702 A1* | 4/2014 | Mizushima | G06F 12/0246 |
| | | | 711/103 |
| 2015/0143030 A1* | 5/2015 | Gorobets | G11C 11/5628 |
| | | | 711/103 |
| 2015/0160893 A1* | 6/2015 | Gorobets | G06F 3/061 |
| | | | 711/103 |
| 2016/0078951 A1* | 3/2016 | Lin | G11C 16/0483 |
| | | | 365/185.29 |
| 2018/0165032 A1* | 6/2018 | Bandic | G06F 3/0608 |
| 2019/0034105 A1* | 1/2019 | Natarajan | G06F 3/0604 |

\* cited by examiner

FML(Free MSB Page List)

| SB Index | Start Segment Index |
|---|---|
| 1 | a |
| 1 | b |
| ⋮ | ⋮ |
| 1 | z |

FML(Free MSB Page List)

| SB Index | Start Segment Index |
|---|---|
| 1 | 5 |
| 1 | 29 |
| 1 | 45 |
| 1 | 53 |
| 1 | 85 |
| 1 | 93 |
| 1 | 101 |
| 1 | 125 |

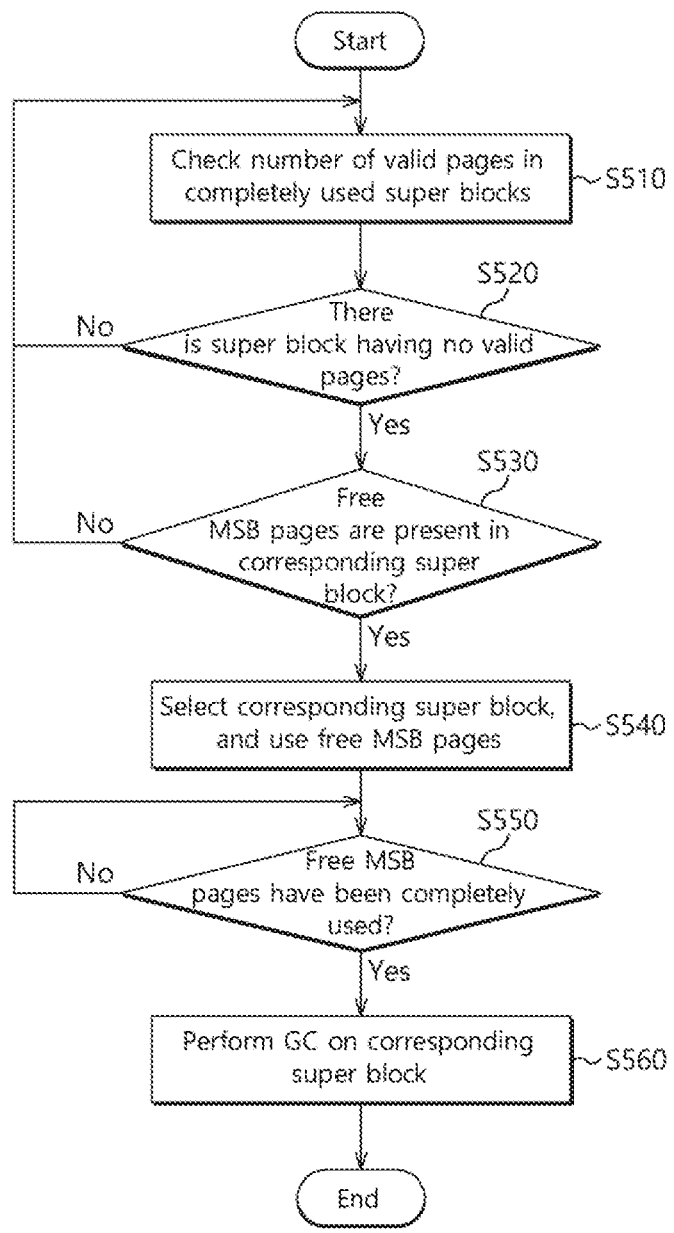

RAISING USAGE RATES OF MEMORY BLOCKS WITH A FREE MSB PAGE LIST

CROSS-REFERENCE TO RELATED APPLICATION

The present application claims priority under 35 U.S.C. § 119(a) to Korean patent application number 10-2018-0019160, filed on Feb. 19, 2018, in the Korean Intellectual Property Office, which is incorporated herein by reference in its entirety.

BACKGROUND

1. Technical Field

Various embodiments generally relate to a semiconductor device, and more particularly, to a data storage device and an operating method thereof.

2. Related Art

Recently, the paradigm of the computing environment has changed to a ubiquitous computing environment where a computer system can be used anytime and anywhere. Therefore, the use of portable electronic devices such as mobile phones, digital cameras and notebook computers has rapidly increased. The portable electronic device generally uses a data storage device including a memory device. The data storage device is used to store data which are used in the portable electronic device.

Since the data storage device using a memory device has no mechanical driver, the data storage device exhibits excellent stability and durability, accesses information at high speed, and has low power consumption. The data storage device having such advantages may include a universal serial bus (USB) memory device, a memory card having various interfaces, a universal flash storage (UFS) device, and a solid state drive (SSD).

SUMMARY

Various embodiments are directed to a data storage device capable of raising the usage rate of a memory block, and an operating method thereof.

In an embodiment, a data storage device may include: a nonvolatile memory device having a plurality of super blocks; a memory configured to store a free first logical page list including position information of free first logical pages which are present in completely used super blocks, among the plurality of super blocks; and a processor configured to select a super block having no valid page and having the free first logical pages, among the completely used super blocks, based on the free first logical page list, and to use the free first logical pages in the selected super block during a write operation.

In an embodiment, an operating method of a data storage device may include: checking the number of valid pages in each of completely used super blocks, determining whether there is a completely used super blocks having no valid page and having free MSB pages, among the completely used super blocks; selecting a super block having no valid page and having free MSB pages, based on the determining, and using the free MSB pages in the selected super block during a write operation.

In an embodiment, an operating method of a data storage device may include: checking the number of valid pages in each of completely used super blocks; selecting a super block having no valid page and having free first logical pages, among the completely used super blocks, based on a free first logical page list; and using the free first logical pages in the selected super block during a write operation. The free first logical page list includes position information of the free first logical pages in each of the completely used super blocks.

BRIEF DESCRIPTION OF THE DRAWINGS

FIG. 2B illustrates a configuration of a first super block of FIG. 2A in accordance with an embodiment of the present disclosure.

FIG. 3 illustrates a free MSB page list FML in accordance with an embodiment of the present disclosure.

FIG. 4A illustrates a state of a completely used super block in accordance with an embodiment of the present disclosure.

FIG. 4B illustrates a free MSB page list FML for the super block of FIG. 4A in accordance with an embodiment of the present disclosure.

FIG. 5 is a flowchart illustrating an operating method of a data storage device in accordance with an embodiment of the present disclosure.

DETAILED DESCRIPTION

Figure 1:
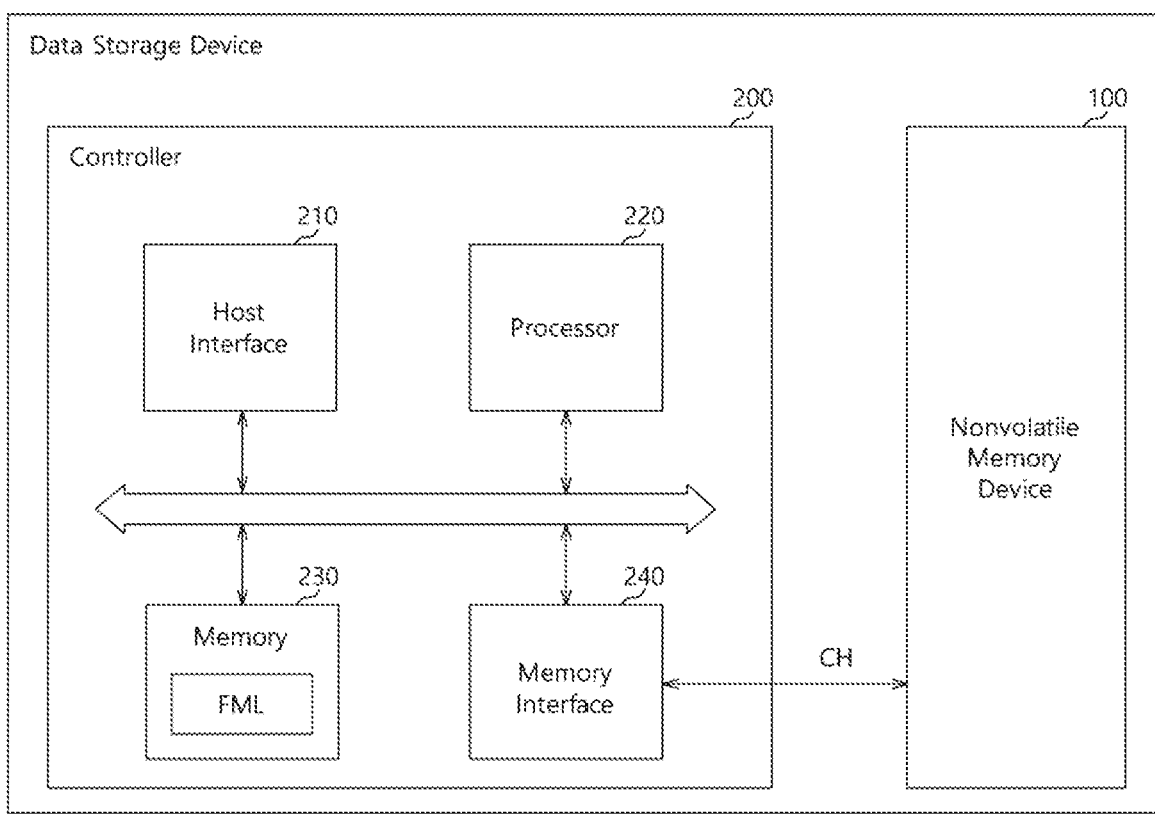
FIG. 1 is a block diagram illustrating a data storage device in accordance with an embodiment of the present disclosure.

A data storage device and an operating method thereof in accordance with the present disclosure will be described below with reference to the accompanying drawings through various embodiments. However, those skilled in the art will understand, in light of this disclosure, that various modifications and variations may be made, and thus the present invention is not limited to the embodiments set forth herein. Rather, the described embodiments are provided so that this disclosure is thorough and complete and fully conveys the scope of the disclosure to those skilled in the art to which this invention pertains. Throughout the disclosure, like reference numerals refer to like parts throughout the various figures and examples of the disclosure. Also, throughout the specification, reference to "an embodiment," "another embodiment," or the like is not necessarily to only one embodiment, and different references to any such phrase are not necessarily to the same embodiment(s).

It will be understood that, although the terms "first," "second," "third," and the like may be used to identify various elements, these elements are not limited by these terms. These terms are merely used to distinguish one element from another element that otherwise have the same or similar names.

The drawings are not necessarily to scale and, in some instances, proportions may have been exaggerated in order to clearly illustrate features of the embodiments. When an element is referred to as being connected or coupled to another element, the former can be directly connected or coupled to the latter, or electrically connected or coupled to the latter via one or more intervening elements.

It will be further understood that when an element is referred to as being "connected to," or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments and is not intended to be limiting of the present invention.

As used herein, singular forms are intended to include the plural forms and vice versa, unless the context clearly indicates otherwise.

It will be further understood that the terms "comprises," "comprising," "includes," and "including" when used in this specification, specify the presence of the stated elements but do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating the configuration of a data storage device 10 in accordance with an embodiment. In the illustrated embodiment, the data storage device 10 may store data which are accessed by a host device (not shown) such as a mobile phone, MP3 player, laptop computer, desktop computer, game machine, TV or in-vehicle infotainment system. The data storage device 10 may be referred to as a memory system.

The data storage device 10 may be configured as any one of various storage devices, depending on a host interface establishing a transmission protocol with the host device. For example, the data storage device 10 may be implemented as any one of various storage devices including a solid state drive (SSD), a multi-media card (MMC, eMMC, RS-MMC or micro-MMC), a secure digital (SD) card (mini-SD or micro-SD), a universal storage bus (USB) storage device, a universal flash storage (UFS) device, a personal computer memory card international association (PCM-CIA)-type storage device, a peripheral component interconnection (PCI) card-type storage device, a PCI express (PCI-E) card-type storage device, a compact flash (CF) card, a smart media card and a memory stick.

The data storage device 10 may be fabricated as any one of various types of packages including a package-on-package (POP), a system-on-chip (SOC), a multi-chip package (MCP), a chip-on-board (COB), a wafer-level fabricated package (WFP) and a wafer-level stack package (WSP).

Referring to FIG. 1, the data storage device 10 may include a nonvolatile memory device 100 and a controller 200.

The nonvolatile memory device 100 may operate as a storage medium of the data storage device 10. Depending on memory cells, the nonvolatile memory device 100 may be implemented with any one of various nonvolatile memory devices including a NAND flash memory device, a NOR flash memory device, a ferroelectric random access memory (FRAM) using a ferroelectric capacitor, a magnetic random access memory (MRAM) using a tunneling magneto-resistive (TMR) film, a phase change random access memory (PRAM) using chalcogenide alloys, and a resistive random access memory (ReRAM) using a transition metal oxide.

FIG. 1 illustrates that the data storage device 10 includes one nonvolatile memory device 100. However, this is only an example and for clarity of illustration. The data storage device 10 may include a plurality of nonvolatile memory devices.

The nonvolatile memory device 100 may include a memory cell array having a plurality of memory cells arranged at the respective intersections between a plurality of bit lines (not illustrated) and a plurality of word lines (not illustrated).

Each of the memory cells in the memory cell array may be set to a single level cell (SLC) capable of storing one bit, a multi-level cell (MLC) capable of storing 2-bit data, a triple level cell (TLC) capable of storing 3-bit data, or a quad level cell (QLC) capable of storing 4-bit data. The memory cell array may include one or more of the SLC, the MLC, the TLC and the QLC. For example, the memory cell array may include memory cells in a two-dimensional horizontal structure or memory cells in a three-dimensional vertical structure.

Figure 2A:
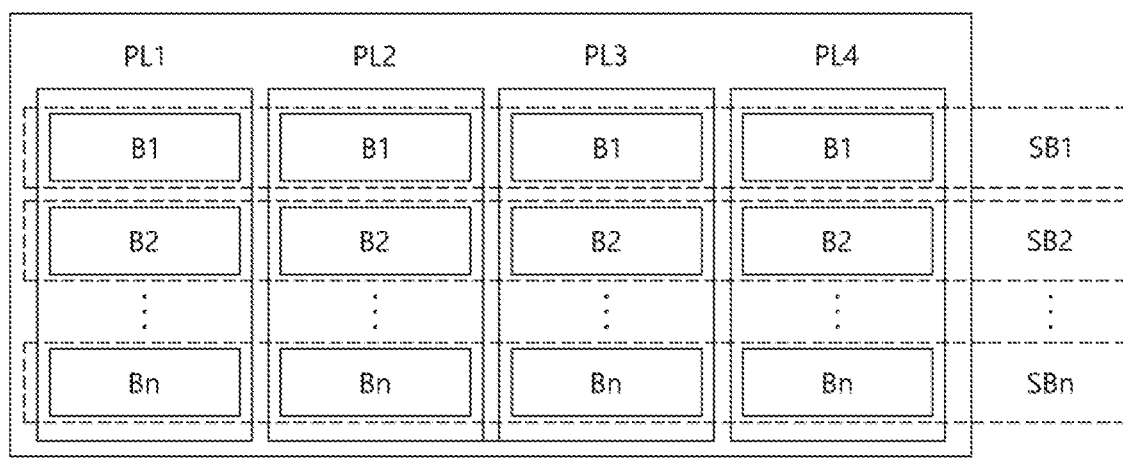
FIG. 2A illustrates a configuration of a nonvolatile memory device of FIG. 1 in accordance with an embodiment of the present disclosure.

FIG. 2A illustrates a configuration of the nonvolatile memory device of FIG. 1. In the illustrated configuration, the nonvolatile memory device 100 includes one die, and the die includes four planes PL1 to PL4. However, the nonvolatile memory device 100 may include more than one die and each may include any suitable number of planes.

Referring to FIG. 2A, each of first to fourth planes PL1 to PL4 may include a plurality of memory blocks, for example, memory blocks B1 to Bn, where n is an integer greater than or equal to 2.

Corresponding memory blocks in the first to fourth planes PL1 to PL4 may be set to a memory block group. One memory block group obtained by grouping the corresponding memory blocks in the first to fourth planes PL1 to PL4 may be referred to as a super block SB. For example, the first memory blocks B1 of the first to fourth planes PL1 to PL4 may be grouped as a first super block SB1. Since each of the first to fourth planes PL1 to PL4 includes n memory blocks B1 to Bn, the nonvolatile memory device 100 may include first to nth super blocks SB1 to SBn.

Figure 2B:
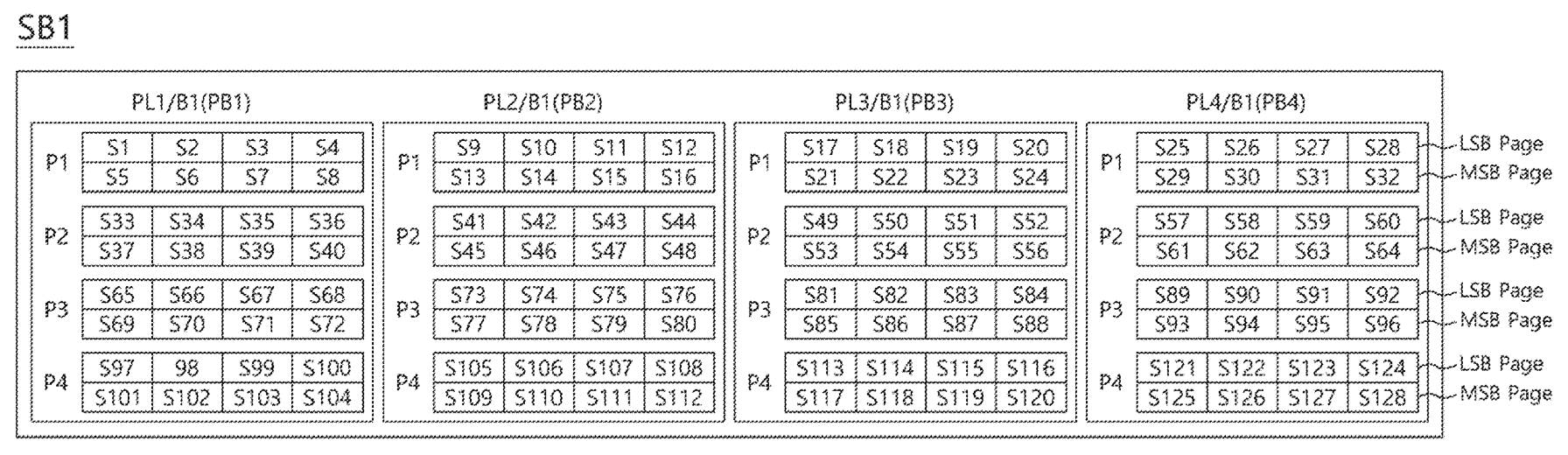

FIG. 2B illustrates a configuration of the first super block SB1 of FIG. 2A. In the illustrated configuration one memory block includes four pages P1 to P4, and each of the pages P1 to P4 included in each of the memory blocks has MLCs. The present invention, however, is not limited to this configuration and other suitable configuration may also be used.

Referring to FIG. 2B, the first super block SB1 may include the first memory block B1 of the first plane PL1, the first memory block B1 of the second plane PL2, the first memory block B1 of the third plane PL3 and the first memory block B1 of the fourth plane PL4. The first memory block B1 of the first plane PL1 may be referred as a 'first physical block PB1', the first memory block B1 of the second plane PL2 may be referred to as a 'second physical block PB2', the first memory block B1 of the third plane PL3 may be referred to as a 'third physical block PB3, and the first memory block B1 of the fourth plane PL4 may be referred to as a 'fourth physical block PB4'. The first to fourth physical blocks PB1 to PB4 may be physically independent of one another.

Each of the first to fourth physical blocks PB1 to PB4 may include four pages, i.e., the first to fourth pages P1 to P4. Each of the pages P1 to P4 in each of the physical blocks PB1 to PB4 may include a plurality of segments. FIG. 2B illustrates that one page includes eight segments, but the number of segments in one page is not specifically limited thereto.

Each of the pages P1 to P4 in each of the physical blocks PB1 to PB4 may include the least significant bit (LSB) page for storing LSB data and the most significant bit (MSB) page for storing MSB data. The LSB page and the MSB page may be logically separated from each other. Among the eight segments for each of the pages P1 to P4 in each of the physical blocks PB1 to PB4, four segments may correspond to the LSB page, and the other segments may correspond to the MSB page. The segments in each of the pages P1 to P4 in each of the physical blocks PB1 to PB4 may have unique indexes. The indexes of the respective segments may indicate position information of the segments.

When data are stored in the first page P1 of the first physical block PB1, a write or program operation for storing LSB data in the LSB page of the first page P1 may be first performed, and a write operation for storing MSB data in the MSB page of the first page P1 may be then performed. When a sudden power-off (SPO) occurs during the write operation for the MSB page, the data stored in the LSB page may be damaged while the write operation for the MSB is stopped.

In order to resolve such a concern, an LSB backup method may be used. According to the LSB backup method, when the LSB data are written in the LSB page of the first page P1 of the first physical block PB1, the same LSB data may be backed up in the LSB page of another physical block, for example, the first page P1 of the second physical block PB2. Further, a paired page skip (PPS) method may be used. According to the PPS method, when specific LSB data are written in the LSB page of a specific page, MSB data may not be written in the MSB page of the corresponding page, but the next write operation may be started from the LSB page of the next page. The specific LSB data may include data which are not allowed to be damaged.

Figure 4A:
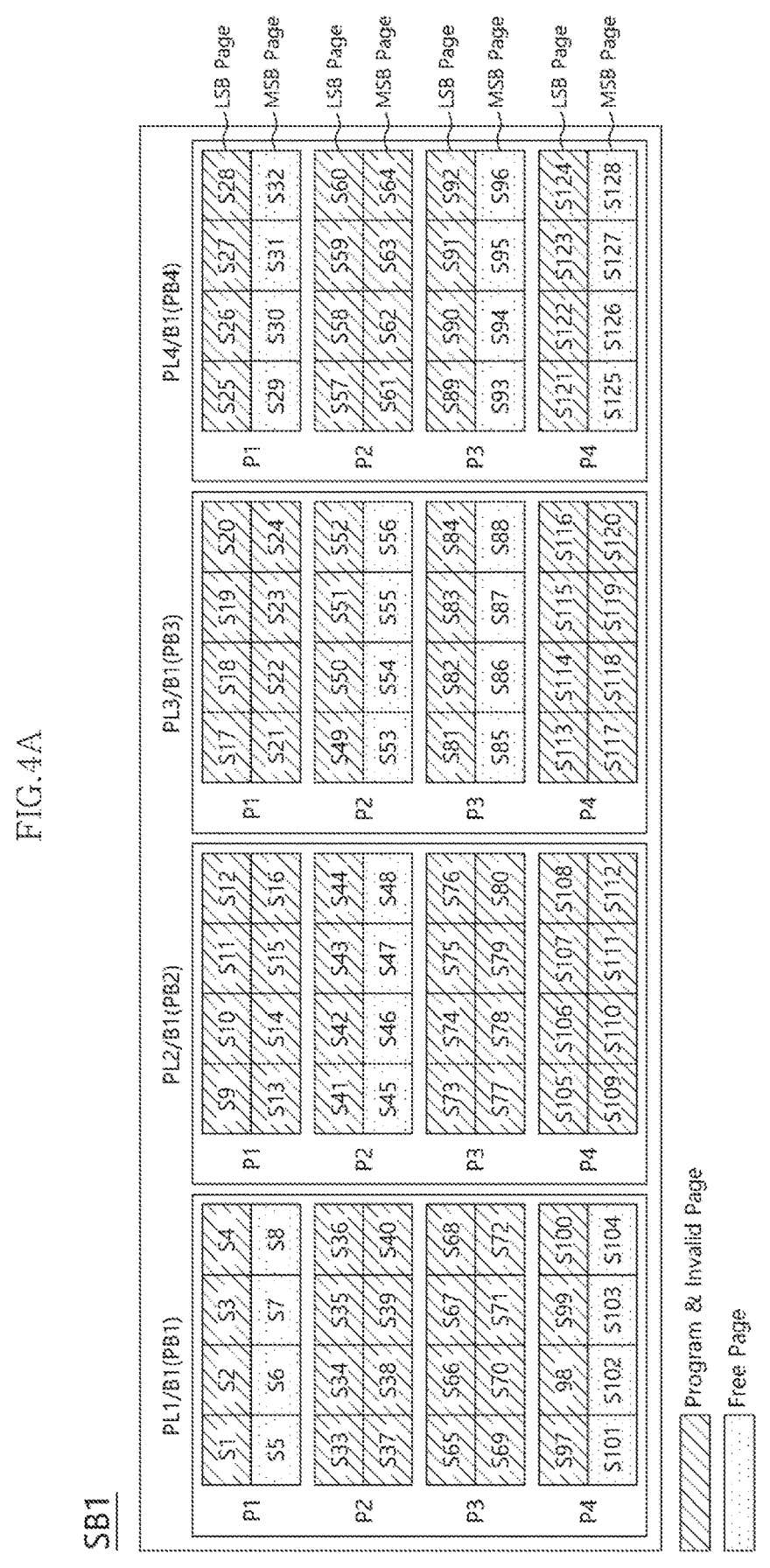

When the PPS method is used, the data capacity which can be actually used in the super block SB may be less than the available data capacity of the super block SB. In FIG. 2B, when the data which can be stored in one page are 32 Kbyte (16-Kbyte LSB data+16-Kbyte MSB data), the total amount of data which can be stored in the first super block SB1 may be 512 Kbyte. As illustrated in FIG. 4A, when eight MSB pages are skipped through the PPS method, the amount of data which can be actually used in the first super block SB1 may be 384 Kbyte. Furthermore, as the number of MSB pages skipped by the PPS method in a specific super block is increased, the lifetime of the nonvolatile memory device 100 may be shortened since the erase/write (E/W) cycle of the super block increases.

In an embodiment, free MSB pages which are present in a completely used super block having no valid pages may be managed through a separate list. In general, such a completely used super block having no valid pages may be erased and converted into a free super block. In an embodiment, however, the data storage device 10 may determine whether free MSB pages are present in a super block, by referring to a free MSB page list corresponding to the super block. When free MSB pages are present, the data storage device 10 may not erase the super block, but reuse the free MSB pages to perform a write operation which is subsequently request. The free MSB page may indicate an MSB page on which a write operation has been skipped through the PPS method.

As the free MSB pages are reused, the number of valid pages in the corresponding super block may be increased. When the reuse of all the free MSB pages is completed, the data storage device 10 may convert the corresponding super block into a free super block by performing a garbage collection (GC) on the corresponding super block.

As such, when the garbage collection is performed on the super block SB after all of the free MSB pages within the super block SB are used, the usage rate of the super block SB may be increased, since the E/W cycle of the super block SB is reduced, which in turn may increase the lifetime of the nonvolatile memory device 100.

The controller 200 may include a host interface 210, a processor 220, a memory 230 and a memory interface 240.

The host interface 210 may interface the host device (not illustrated) and the data storage device 10. For example, the host interface 210 may communicate with the host device using any one of standard transmission protocols including USB, UFS, MMC, PATA (parallel advanced technology attachment), SATA (serial advanced technology attachment), SCSI (small computer system interface), SAS (serial attached SCSI), PCI (peripheral component interconnection) and PCI-E.

The processor 220 may include a micro control unit (MCU) or a central processing unit (CPU). The processor 220 may process a command transmitted from the host device. The processor 220 may drive a code-based instruction or algorithm, i.e. software, which is loaded into the memory 230 in order to process a command, and control internal function blocks and the nonvolatile memory device 100.

The memory 230 may include a RAM such as a DRAM or SRAM. The memory 230 may store the software driven by the processor 220. Furthermore, the memory 230 may store data required for driving software. That is, the memory 230 may operate as a working memory of the processor 220.

The memory 230 may temporarily store data to be transmitted to the nonvolatile memory device 100 from the host device, and data read from the nonvolatile memory device 100 to be transmitted to the host device. That is, the memory 230 may operate as a buffer memory.

The memory 230 may store a free MSB page list FML including the position information of free MSB pages within super blocks. The free MSB page list FML may be generated for each of the super blocks included in the nonvolatile memory device 100, or generated for only a super block that is accessed.

FIG. 3 illustrates a free MSB page list FML in accordance with an embodiment.

Referring to FIG. 3, the free MSB page list FML may store the index of a super block (SB index) and start segment indexes of free MSB pages. Although FIG. 3 illustrates only the free MSB page list FML for the first super block SB1, the free MSB page list FML may be generated separately for each of the super blocks. Since one MSB page includes four segments and write operations are simultaneously performed on the four segments when MSB data are stored, the free MSB page list FML may include only the start segment indexes. In some cases, however, the start segment indexes and the end segment indexes of the free MSB pages may be all stored.

FIG. 4A illustrates the state of the first super block SB1 which has been completely used, and FIG. 4B illustrates the free MSB page list FML for the first super block SB1 of FIG. 4A. The completely used super block SB1 may include a super block on which write operations up to the last page P4 of the last physical block PB4 have been completed. For convenience of description, suppose that all of the pages having data stored therein in the completely used first super block SB1 are all invalid pages. An invalid page may occur when data are newly stored at a position having a physical address different from the physical address of the corresponding page, in response to a write request for the same logical address as a logical address corresponding to the physical address of the corresponding page. That is, an invalid page may indicate a page where old data are stored.

Referring to FIG. 4A, write operations have been performed up to the last page of the last physical block, i.e., the fourth page P4 of the fourth physical block PB4 in the first super block SB1. Since eight PPS operations are performed until the first super block SB1 is completely used, there are eight free MSB pages on which a write operation is not performed but skipped.

For example, when a write operation for the LSB page of the first page of the first physical block PB1 is completed according to a request of the host device or need determined by the processor 220, the processor 220 may transmit a PPS command for performing a PPS operation to the nonvolatile memory device 100. The PPS command may be a command for skipping a MSB data write operation for the current page (i.e., a page that is completed the write operation for the LSB page) and performing a write operation on the next LSB page. Therefore, the MSB page of the first page P1 of the first physical block PB1 may correspond to a free page on which no write operations have been performed. While the first super block SB1 is accessed, eight PPS commands may be transmitted by the processor 220. As a result, eight free MSB pages may be present as illustrated in FIG. 4A.

Whenever transmitting the PPS command to the nonvolatile memory device 100, the processor 220 may record the index of the super block (SB index) that is accessed and the start segment indexes of the skipped MSB pages into the free MSB page list FML illustrated in FIG. 4B. Referring to FIG. 4B, the start segment indexes of 5, 29, 45, 53, 85, 93, 101 and 125 for the eight free MSB pages in the first super block SB1 may be recorded in the FML.

The processor 220 may not immediately use a completely used super block in which free MSB pages are present. When the number of valid pages in a super block is '0', the processor 220 may use the free MSB pages present in the super block. The processor 220 may check whether the number of valid pages for each of the completely used super blocks SB is '0', and select and use a super block in which free MSB pages are present, among the super blocks in which the number of valid pages is '0'. When all of the free MSB pages of the selected super block are used, the processor 220 may perform a garbage collection on the super block to transfer data of pages corresponding to the used free MSB pages to another super block, and then erase the super block and convert into a free super block.

The memory interface 240 may control the nonvolatile memory device 100 under the control of the processor 220. The memory interface 240 may be referred to as a memory controller. The memory interface 240 may provide control signals to the nonvolatile memory device 100. The control signals may include commands and addresses for controlling the nonvolatile memory device 100. The memory interface 240 may provide data to the nonvolatile memory device 100, or receive data from the nonvolatile memory device 100. The memory interface 240 may be coupled to the nonvolatile memory device 100 through a channel CH including one or more signal lines.

FIG. 5 is a flowchart illustrating an operating method of a data storage device in accordance with an embodiment. The operation method of the data storage device in accordance with an embodiment is described with reference not only to FIG. 5, but FIGS. 1 to 4B as well.

At step S510, the processor 220 of the controller 200 may check the numbers of valid pages in completely used super blocks.

At step S520, the processor 220 may determine whether there is a super block in which the number of valid pages is '0', among the completely used super blocks. When there is no super block in which the number of valid pages is '0', the process may return to step S510. When there is a super block SB where the number of valid pages is '0', the process may proceed to step S530.

When it is determined, at step S520, that there is a super block in which the number of valid pages is '0', the processor 220 may determine, at step S530, whether free MSB pages are present in the super block in which the number of valid pages is '0'. The processor 220 may determine whether the free MSB pages are present in the corresponding super block by referring to the free MSB page list FML stored in the memory 230. The free MSB page list FML may be generated as the index of a specific super block and the start segment indexes of skipped MSB pages that are stored whenever the processor 220 transmits a PPS command to the nonvolatile memory device 100 while the corresponding super block is accessed. When no free MSB pages are present in the corresponding super block, the process may return to step S510. When the free MSB pages are present in the corresponding super block SB, the process may proceed to step S540.

When it is determined, at step S530, that the free MSB pages are present in the corresponding super block, the processor 220 may select, at step S540, the corresponding super block as an open super block, i.e., a super block to be used, and use the free MSB pages present in the super block during a write operation.

At step S550, the processor 220 may determine whether all of the free MSB pages present in the super block selected at step S540 have been used. When all of the free MSB pages have not been used, the process may repeat step S550.

When it is determined, at step S550, that all of the free MSB pages have been used, the processor 220 may perform a garbage collection (GC) on the corresponding super block at step S560. For example, the processor 220 may transfer data stored in pages including the used free MSB pages to another super block, and then convert the corresponding super block into a free super block SB by performing an erase operation on the super block.

In accordance with an embodiment, since the free MSB pages present in the completely used super block are reused during a write operation, the usage rate of the super block may be increased, and the E/W cycle may be reduced thereby increasing the lifetime of the nonvolatile memory device.

Figure 6:
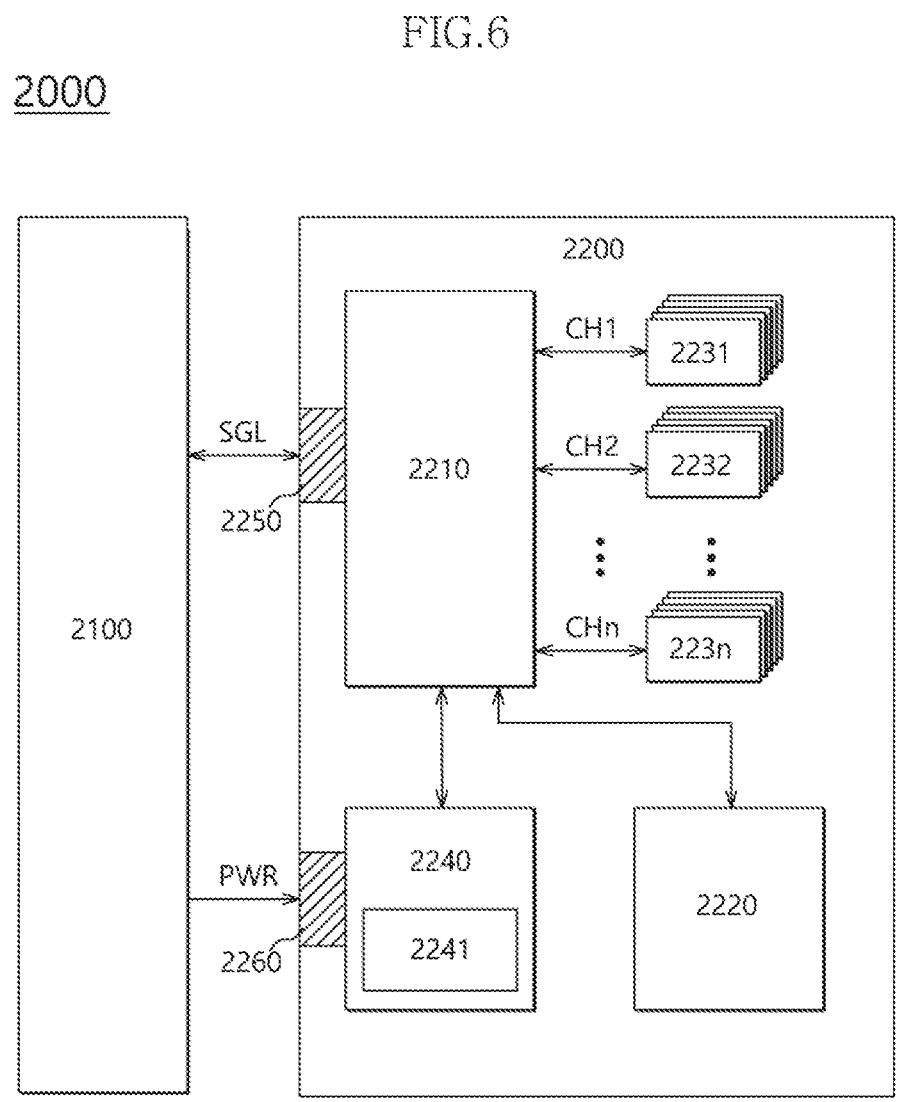
FIG. 6 is a diagram illustrating a data processing system including a solid state drive (SSD) in accordance with an embodiment of the present disclosure.

FIG. 6 is a diagram illustrating a data processing system including a solid state drive (SSD) in accordance with an embodiment. Referring to FIG. 6, a data processing system 2000 may include a host apparatus 2100 and a SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured of various types of connectors according to an interfacing method between the host apparatus 2100 and the SSD 2200.

Figure 7:
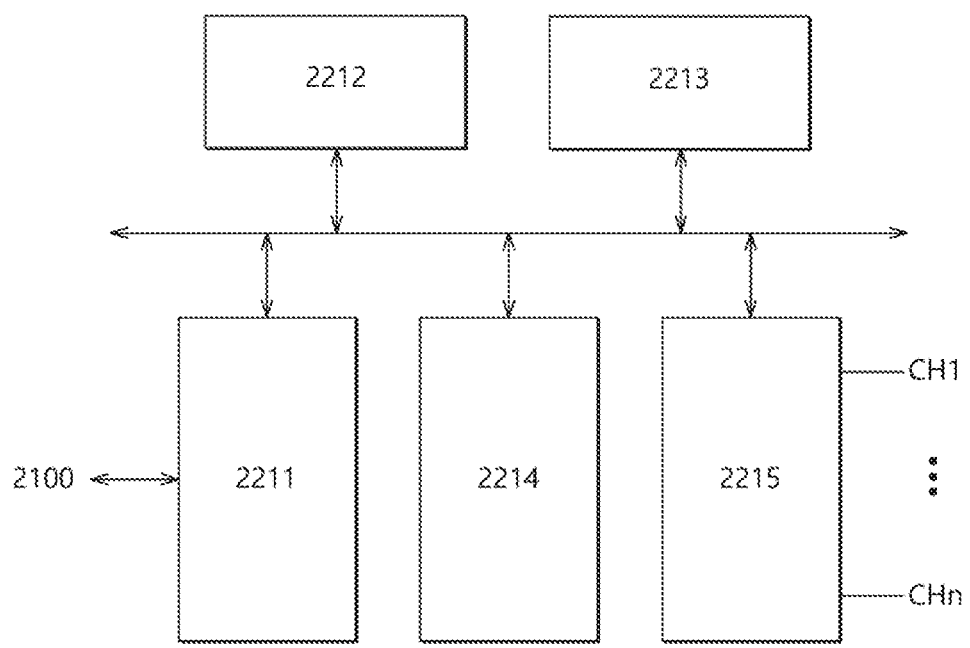
FIG. 7 is a diagram illustrating a controller illustrated in FIG. 8.

FIG. 7 is a diagram illustrating the controller 2210 of FIG. 6. Referring to FIG. 7, the controller 2210 may include a host interface 2211, a control component 2212, a random access memory (RAM) 2213, an error correction code (ECC) component 2214, and a memory interface 2215.

The host interface 2211 may perform interfacing between the host apparatus 2100 and the SSD 2200 according to a protocol of the host apparatus 2100. For example, the host interface 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (DATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface 2211 may perform a disc emulation function that the host apparatus 2100 recognizes the SSD 2200 as a general-purpose data storage apparatus, for example, a hard disc drive HDD.

The control component 2212 may analyze and process the signal SGL input from the host apparatus 2100. The control component 2212 may control operations of internal functional blocks according to firmware and/or software for driving the SDD 2200. The RAM 2213 may be operated as a working memory for driving the firmware or software.

The ECC component 2214 may generate parity data for the data to be transferred to the nonvolatile memory devices 2231 to 223n. The generated parity data may be stored in the nonvolatile memory devices 2231 to 223n together with the data. The ECC component 2214 may detect errors for data read from the nonvolatile memory devices 2231 to 223n based on the parity data. When detected errors are within a correctable range, the ECC component 2214 may correct the detected errors.

The memory interface 2215 may provide a control signal such as a command and an address to the nonvolatile memory devices 2231 to 223n according to control of the control component 2212. The memory interface 2215 may exchange data with the nonvolatile memory devices 2231 to 223n according to control of the control component 2212. For example, the memory interface 2215 may provide data stored in the buffer memory device 2220 to the nonvolatile memory devices 2231 to 223n or provide data read from the nonvolatile memory devices 2231 to 223n to the buffer memory device 2220.

Figure 8:
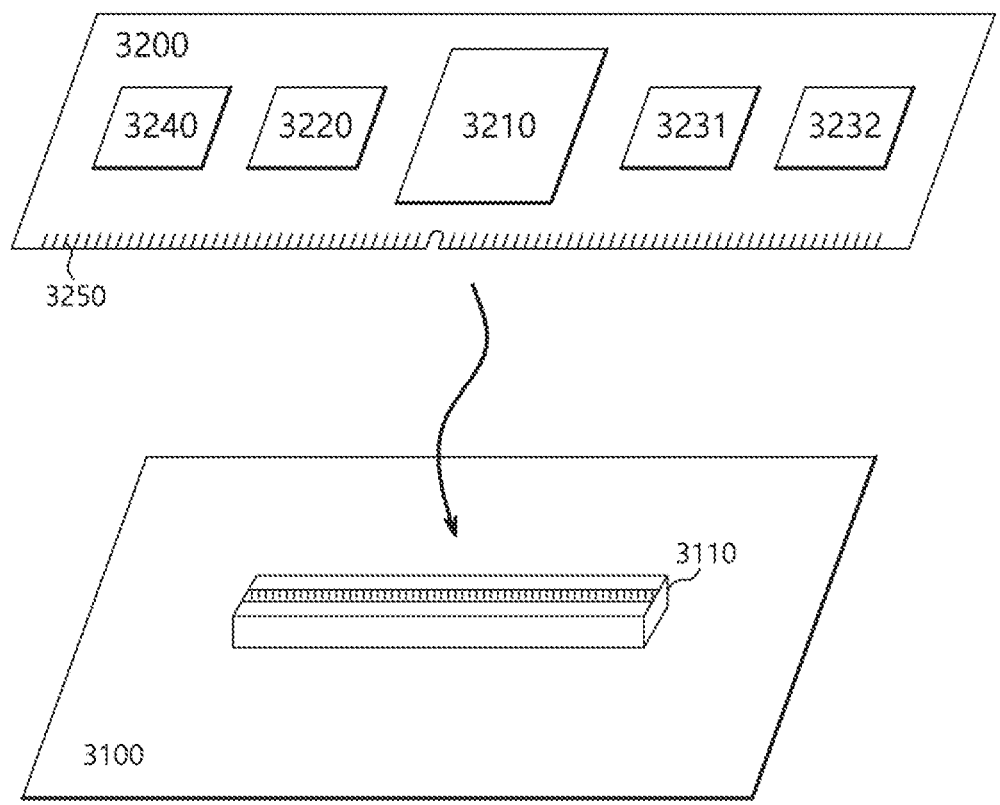
FIG. 8 is a diagram illustrating a data processing system including a data storage apparatus in accordance with an embodiment of the present disclosure.

FIG. 8 is a diagram illustrating a data processing system including a data storage apparatus in accordance with an embodiment. Referring to FIG. 8, a data processing system 3000 may include a host apparatus 3100 and a data storage apparatus 3200.

The host apparatus 3100 may be configured in a board form such as a printed circuit board (PCB). Although not shown in FIG. 8, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage apparatus 3200. The controller 3210 may have the same configuration as the controller 2210 illustrated in FIG. 7.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in any one side of the data storage apparatus 3200.

Figure 9:
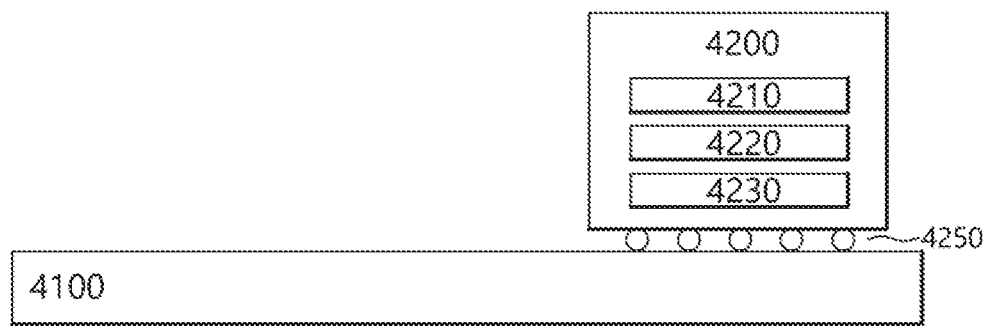
FIG. 9 is a diagram illustrating a data processing system including a data storage apparatus in accordance with an embodiment of the present disclosure.

FIG. 9 is a diagram illustrating a data processing system including a data storage apparatus in accordance with an embodiment. Referring to FIG. 9, a data processing system 4000 may include a host apparatus 4100 and a data storage apparatus 4200.

The host apparatus 4100 may be configured in a board form such as a PCB. Although not shown in FIG. 9, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control an overall operation of the data storage apparatus 4200. The controller 4210 may have the same configuration as the controller 2210 illustrated in FIG. 7.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 10:
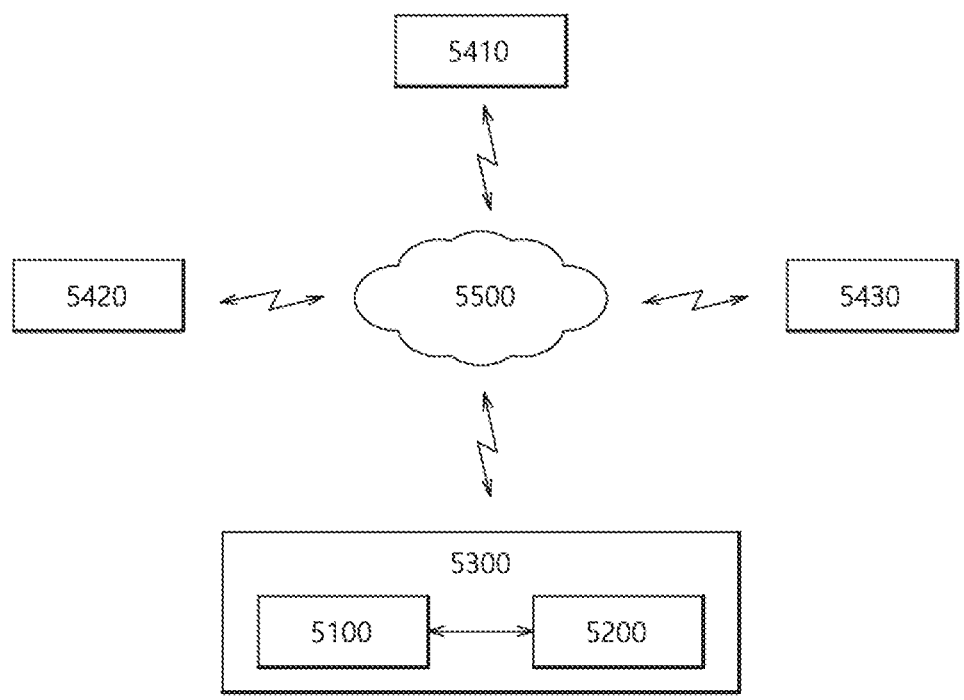
FIG. 10 is a diagram illustrating a network system including a data storage apparatus in accordance with an embodiment of the present disclosure.

FIG. 10 is a diagram illustrating a network system 5000 including a data storage apparatus in accordance with an embodiment. Referring to FIG. 10, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the data storage apparatus 10 of FIG. 1, the data storage apparatus 2200 of FIG. 6, the data storage apparatus 3200 of FIG. 8, or the data storage apparatus 4200 of FIG. 9.

Figure 11:
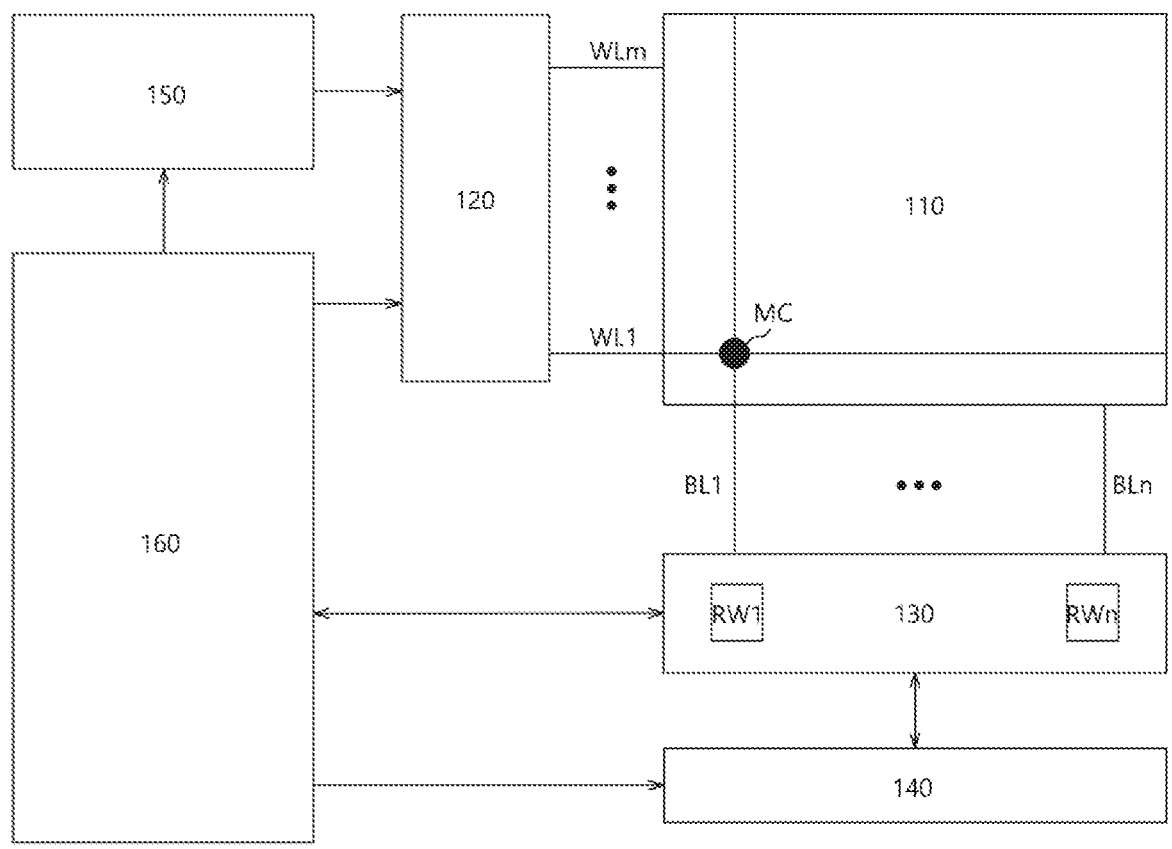
FIG. 11 is a block diagram illustrating a nonvolatile memory device included in a data storage apparatus in accordance with an embodiment of the present disclosure.

FIG. 11 is a block diagram illustrating a nonvolatile memory device included in a data storage apparatus in accordance with an embodiment. Referring to FIG. 11, a nonvolatile memory device 100 may include a memory cell array 110, a row decoder 120, a column decoder 140, a data read/write block 130, a voltage generator 150, and control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation (i.e., a program operation), and an erase operation of the nonvolatile memory device 100.

The above described embodiments of the present invention are intended to illustrate, not to limit, the present invention. Various alternatives and equivalents are possible, as those skilled in the art will appreciate in light of the present disclosure. Thus, the present invention is not limited by the embodiments described herein. Nor is the invention limited to any specific type of semiconductor device, to the present invention encompasses all modifications and variations of the disclosed embodiments that fall within the scope of the appended claims.

What is claimed is:

1. A data storage device comprising:
a nonvolatile memory device having a plurality of super blocks, wherein each of the super blocks comprises a plurality of memory blocks, each having a plurality of pages, and each of the pages comprises a least significant bit (LSB) page and a most significant bit (MSB) page; and
a processor configured to check the number of valid pages in each of completely used super blocks among the plurality of super blocks, wherein a completely used super block is a super block in which each page has been written to, to determine whether there is a completely used super block having no valid page and having free MSB pages, among the completely used super blocks, to select the completely used super block, based on the determination, and to use the free MSB pages in the selected completely used super block during a write operation.

2. The data storage device according to claim 1, further comprising:
a memory configured to store a free MSB page list including position information of free MSB pages which are present in the completely used super blocks, among the plurality of super blocks.

3. The data storage device according to claim 2, wherein whenever transmitting a paired page skip (PPS) command to the nonvolatile memory device while a specific super block is accessed, the processor matches an index of the specific super block with the position information of skipped MSB pages, and stores the matched information in the free MSB page list.

4. The data storage device according to claim 2, wherein the processor determines whether the free MSB pages are present in the each of completely used super blocks, based on the free MSB page.

5. The data storage device according to claim 2, wherein each of the LSB page and the MSB page comprises a plurality of segments, and
the position information of the free MSB pages comprises an index of a start segment among the plurality of segments.

6. The data storage device according to claim 1, wherein the processor performs a garbage collection on the selected completely used super block when all of the free MSB pages present in the selected completely used super block are used.

7. An operating method of a data storage device including a nonvolatile memory device having a plurality of super blocks, wherein each of the super blocks comprises a plurality of memory blocks, each having a plurality of pages, and each of the pages comprises a least significant bit (LSB) page and a most significant bit (MSB) page, the operating method comprising:
checking the number of valid pages in each of completely used super blocks, wherein the completely used super blocks are super blocks where each page has been written to;
determining whether there is a completely used super block having no valid page and having free MSB pages, among the completely used super blocks;
selecting the completely used super block, based on the determining; and
using the free MSB pages in the selected completely used super block during a write operation.

8. The operating method according to claim 7, wherein the determining of whether the completely used super block has free MSB pages is performed based on a free MSB page list stored in a memory of a controller of the data storage device.

9. The operating method according to claim 8, wherein the free MSB page list is generated by matching an index of a specific super block with the position information of skipped MSB pages to store the matched information, whenever a PPS command is transmitted to the nonvolatile memory device of the data storage device while the specific super block is accessed.

10. The operating method according to claim 8, wherein each of the LSB page and the MSB page comprises a plurality of segments,
and wherein the position information of the MSB page comprises an index of a start segment among the plurality of segments.

11. The operating method according to claim 7, further comprising:
determining whether all of the free MSB pages in the selected completely used super block are used; and
performing a garbage collection on the selected completely used super block when all of the free MSB pages are used.

* * * * *